(12) United States Patent
Jansen

(10) Patent No.: US 9,403,728 B2
(45) Date of Patent: Aug. 2, 2016

(54) FLAME-RETARDANT PRODUCT AND USE THEREOF

(71) Applicant: Refratechnik Holding GmbH, Ismaning (DE)

(72) Inventor: Helge Jansen, Friedland (DE)

(73) Assignee: Refratechnik Holding GmbH, Ismaning (DE)

(*) Notice: Subject to any disclaimer, the term of this patent is extended or adjusted under 35 U.S.C. 154(b) by 0 days.

(21) Appl. No.: 14/411,154

(22) PCT Filed: May 23, 2013

(86) PCT No.: PCT/EP2013/060572
§ 371 (c)(1),
(2) Date: Dec. 24, 2014

(87) PCT Pub. No.: WO2014/016010
PCT Pub. Date: Jan. 30, 2014

(65) Prior Publication Data
US 2015/0175488 A1   Jun. 25, 2015

(30) Foreign Application Priority Data
Jul. 27, 2012 (DE) .......................... 10 2012 015 026

(51) Int. Cl.
*C04B 35/66* (2006.01)
*C04B 35/043* (2006.01)
(Continued)

(52) U.S. Cl.
CPC ............... *C04B 35/66* (2013.01); *C04B 35/043* (2013.01); *C04B 35/624* (2013.01); *C04B 35/6316* (2013.01); *F27D 1/003* (2013.01); *F27D 1/0006* (2013.01); *C04B 2235/3206* (2013.01); *C04B 2235/3418* (2013.01); *C04B 2235/3445* (2013.01); *C04B 2235/3826* (2013.01); *C04B 2235/5409* (2013.01); *C04B 2235/5427* (2013.01); *C04B 2235/5454* (2013.01); *C04B 2235/5463* (2013.01); *C04B 2235/5481* (2013.01); *C04B 2235/608* (2013.01); *C04B 2235/656* (2013.01); *C04B 2235/6583* (2013.01); *C04B 2235/96* (2013.01)

(58) Field of Classification Search
CPC ........ C04B 35/04; C04B 35/043; C04B 35/20
See application file for complete search history.

(56) References Cited

U.S. PATENT DOCUMENTS 4,497,901 A   2/1985   Ohtsuki et al.
8,030,236 B2  10/2011  Klischat et al.

FOREIGN PATENT DOCUMENTS

CN   101 328 070 A   12/2008
CN   101 607 826 A   12/2009
(Continued)

OTHER PUBLICATIONS

International Search Report of PCT/EP2013/060572, mailed Jul. 17, 2013.
(Continued)

*Primary Examiner* — Karl Group
(74) *Attorney, Agent, or Firm* — Collard & Roe, P.C.

(57) ABSTRACT

A flame-retardant batch, and the use thereof, primarily contains—at least 30% by weight of a coarse-grain olivine raw material with a forsterite content of, e.g. at least 70% by weight and having grain sizes of, e.g. 100% by weight over 0.1 mm, —at least 35% by weight in magnesia in meal form with grain sizes of, e.g. 100% by weight.

49 Claims, 7 Drawing Sheets

(51) Int. Cl.
*C04B 35/624* (2006.01)
*C04B 35/63* (2006.01)
*F27D 1/00* (2006.01)

(56) References Cited

FOREIGN PATENT DOCUMENTS

| DE | 31 27 556 A1 | 1/1983 |
| DE | 100 54 125 A1 | 5/2002 |
| DE | 10 2006 007 781 A1 | 8/2007 |
| GB | 2 101 985 A | 1/1983 |
| JP | 49005407 * | 1/1974 |
| JP | S49 5407 A | 1/1974 |

OTHER PUBLICATIONS

Routschka, Intelligent refractory technology for the cement, lime, steel, and non-ferrous metal industries, Refratechnik, Pocket Manual Refractory Materials, New Edition, 2012, 6 pages.

* cited by examiner

FLAME-RETARDANT PRODUCT AND USE THEREOF

CROSS REFERENCE TO RELATED APPLICATIONS

This application is the National Stage of PCT/EP2013/060572 filed on May 23, 2013, which claims priority under 35 U.S.C. §119 of German Application No. 10 2012 015 026.1 filed on Jul. 27, 2012, the disclosure of which is incorporated by reference. The international application under PCT article 21(2) was not published in English.

BACKGROUND OF THE INVENTION

1. Field of the Invention

The invention relates to a refractory product according to ISO/R 836, DIN 51060, in the form of an unmolded or molded batch, which in situ is highly resistant to the corrosion by fayalitic slags (iron silicate slags) and sulfates and is resistant to molten heavy nonferrous metals, especially to copper melts. In addition, the invention relates in particular to uses of the batch.

2. Description of the Related Art

Fayalitic slags are formed, for example, during the manufacture of copper from copper pyrite ($CuFeS_2$). Copper pyrite is roasted to produce so-called copper matte containing cuprous sulfide ($Cu_2S$) and iron compounds, e.g. FeS and $Fe_2O_3$. The copper matte is further processed to raw copper, in the course of which molten copper matte is treated with supply of air and addition of $SiO_2$, e.g. in the form of quartz, in a converter. In the process, a fayalitic slag is formed, containing mainly the mineral fayalite ($2FeO.SiO_2$) and raw cuprous oxide ($Cu_2O$).

At present, the converters for the manufacture of raw copper, e.g. a Pierce-Smith converter, are lined on the firing side mainly with fired magnesia-chromite products (e.g. DE 1471231 A1). However, these refractory products have only insufficient resistance to the corrosion by sulfates, which result from the oxidation of the sulfides, for example in the form of magnesium sulfate. Moreover, magnesia-chromite bricks have only limited or inadequate high-temperature anti-wetting properties, and they have inadequate resistance to penetration by hot heavy nonferrous metals, especially copper melts.

Magnesia-chromite bricks are also used in melting systems for the production of other nonferrous metals (heavy nonferrous metals such as Ni, Pb, Sn, Zn) and suffer from problems of similar nature there.

SUMMARY OF THE INVENTION

The task of the invention is to provide a refractory product that has good anti-wetting properties against heavy nonferrous metal melts, especially against copper melts, exhibits an improved resistance to penetration by fayalitic slags and resists a sulfate corrosion at operating temperatures better than the refractory products used heretofore in this refractory sector.

This task of the invention is accomplished by a refractory batch formed mainly (to more than 90% by wt) from a dry substance mixture of raw olivine substance, magnesia (MgO) and silicon carbide (SiC) as well as a liquid binder in the form of a silica sol ($SiO_2$).

The naturally occurring raw olivine substance, which is available on the market, is used according to the invention as granules, and according to the invention should comprise the mineral forsterite, if at all possible in a proportion of 100% by wt but of at least 70% by wt. The rest may be the mineral fayalite and/or may be other known impurities such as enstatite and/or monticellite and/or merwinite. It is within the scope of the invention to use a synthetically manufactured, pure forsterite material alone or in combination with a raw olivine substance. Where the phrase raw olivine substance is used hereinafter, it also relates to the synthetic forsterite material.

The grain size of the raw olivine granules used lies in the medium and coarse size range, e.g. between 0.1 and 6, especially between 1 and 6 mm, and the granules have, for example, a Gaussian grain-size distribution.

The raw olivine substance is used in proportions between 30 and 60% by wt, especially between 40 and 50% by wt, in the mixture according to the invention.

Magnesia (MgO) is used in flour form or powder form with grain sizes corresponding e.g. to 100% by wt≤1 mm. As examples, fused magnesia and/or sintered magnesia and/or synthetically dead-burned or caustic magnesia are used as the magnesia. (In the context of the invention, the terms "flour" and "powder" are understood as synonyms with identical meaning).

The MgO content of the magnesia should preferably be >90% by wt, especially >95% by wt. The rest are standard impurities such as silicates and/or iron oxide.

The MgO flours also exhibit, for example, a Gaussian grain-size distribution.

The MgO flour is used in the dry mixture in proportions between 35 and 50, especially between 40 and 45% by wt.

Silicon carbide (SiC) is available on the market as a synthetic product with high purity and in various grain sizes and grain-size distributions, and according to the invention is used in powder form or in flour form, according to the invention with grain sizes corresponding, for example, to 100% by wt≤1 mm. The grain-size distribution corresponds preferably to a Gaussian grain-size distribution.

The SiC powder is used, for example, with a purity of >90% by wt, especially >94% by wt of SiC. The proportion used in the dry mixture lies between 5 and 20, especially between 10 and 15% by wt.

Moreover, the dry mixture to be composed up to 100% by wt may optionally contain at least one flour-like or finely divided, dry silica component ($SiO_2$) up to 10, especially up to 5% by wt in the mixture. This $SiO_2$ component of high purity relative to $SiO_2$ may be, for example, microsilica and/or a pyrogenic and/or a precipitated silica available on the market. Furthermore, the dry mixture may contain up to 10, especially up to 5% by wt of antioxidants and/or other standard additives for refractory products, although the quantitative ratio derived from the above proportions for olivine, MgO and SiC must be maintained. This is also true for the optional addition of the dry silica.

According to the invention, a liquid binder in the form of a silica sol that is alkali-free if at all possible or largely alkali-free may be admixed with the dry mixture calculated as 100% by wt according to the invention and described hereinabove. The alkali content of the silica sol should be, for example, less than 1% by wt, especially less than 0.5% by wt. The moist combination of the refractory dry mixture containing only solids and the liquid binder is a refractory batch, which can be used as an unmolded, refractory product for lining smelting systems such as smelting converters for heavy nonferrous metals, or from which molded, unfired and fired refractory products can be manufactured by pressing and used to line the said smelting systems.

Silica sols are known to be silica hydrosols in the form of colloidal disperse solutions of silica in water. A distinction is made between colloidal dispersions of high molecular weight polysilicic acids and colloidal dispersions of amorphous silicon dioxide particles with particle sizes in the nanometer range (nm range). According to the invention, silica sols in the form of colloidal dispersions of amorphous silicon dioxide particles with $SiO_2$ concentrations of between 15 and 50, for example, especially between 20 and 40% by wt are preferably used. In these aqueous colloidal disperse solutions, the amorphous silicon dioxide particles are present in the form of spherical individual particles, which are not cross-linked with one another and which are hydroxylated at the surface. The size of the particles lies in the colloidal range. The average particle size is usually between 5 and 75 nm.

These alkali-free or alkali-low silica sols are handled in the form of low-viscosity liquids that do not undergo phase separation.

Particularly those silica sols with specific surfaces of the $SiO_2$ particles between 100 and 400, especially between 200 and 300 $m^2/g$ and $SiO_2$ solid concentrations between 15 and 20, especially between 20 and 40% by wt are suitable as binders for the purposes of the invention.

According to the invention, silica sols are added in proportions between 2 and 10, especially between 3 and 6% by wt to the dry mixture. Under these conditions, the water content of the silica sols functions mainly to impart a predetermined plasticity or ductility to the batch mixture for workability. The silicon dioxide particles of the silica sol perform mainly the task of ensuring binding of the mixture components via a strengthening gel formation in the batch and by subsequent drying of the batch. Upon exposure to high temperature in situ, this binding is reinforced by reactions of the binding phases with the basic components of the mixture.

The product according to the invention is manufactured by producing a homogeneous batch mixture with predetermined workability mixed from the dry substances comprising raw olivine substance, magnesia flour, SiC and if necessary the dry silica and the liquid silica sol binders in suitable mixers. This ductile compound of a refractory batch may be used for lining smelting converters. However, it is also possible to press this batch to produce molded bricks, which in turn may be used dry and unfired or ceramically fired for lining smelting converters. It is equally well possible to process a batch according to the invention to vibratory compounds or casting compounds or the like and to use them as such.

Thus the invention starts from a dry mixture comprising exclusively or mainly (more than 90% by wt) olivine granules, MgO flour and SiC flour and if necessary a finely divided, dry $SiO_2$ component, such as microsilica, for example.

The invention also relates to a refractory batch, consisting of a certain proportion of the dry mixture and a certain proportion of a silica sol, matched to the proportion of the mixture. The batch is expediently offered on the market in the form of a package comprising two containers, wherein one container contains the mixture of the dry substances and the other container contains the liquid silica sol. For use of a package in the intended manner, the contents of the containers are merely mixed together. Alternatively, the moist batch may be handled premixed in a closed container.

It is also within the scope of the invention to produce pressed molded shapes from a water-containing batch mixture indicated hereinabove and containing silica sol by pressing by means of brick presses, to dry the molded shapes to residual moisture contents of preferably between 0.1 and 2% by wt or, according to a further embodiment of the invention, to dry the molded shapes and to fire them ceramically in a ceramic furnace at temperatures between preferably 1000 and 1300, especially between 1150 and 1250° C. in oxidizing atmosphere for a time period preferably between 4 and 8, especially between 5 and 6 hours. According to the invention, the firing conditions are chosen such that the dry and dried components of the batch react with one another not at all if possible or to only a small extent during firing, so that, in the presence of corrosion by a melt and/or slag, the dry and dried mixture components are available in situ in the converter to provide the assurance according to the invention of refractory character, especially by an anti-wetting effect and a chemical interaction with slag components.

With the unfired and fired compounds and molded shapes according to the invention, it is possible to construct linings and heavy nonferrous metal smelting converters that are superior to the linings heretofore in terms of refractory character and resistance. In particular, the superiority of the refractory products according to the invention is apparent in copper smelting converters, for example in a Pierce-Smith converter (PS converter).

The unfired pressed dried molded shapes have, for example, the following characteristics:
Apparent density: 2.6 to 2.7 $kg/m^3$
Compressive strength: 25 to 50, especially 35 to 45 MPa.

The fired molded shapes according to the invention have, for example, the following characteristics:
Apparent density: 2.55 to 2.65 $kg/m^3$,
Compressive strength: 30 to 55, especially 40 to 50 MPa.

DETAILED DESCRIPTION OF THE PREFERRED EMBODIMENTS

Figure 1:
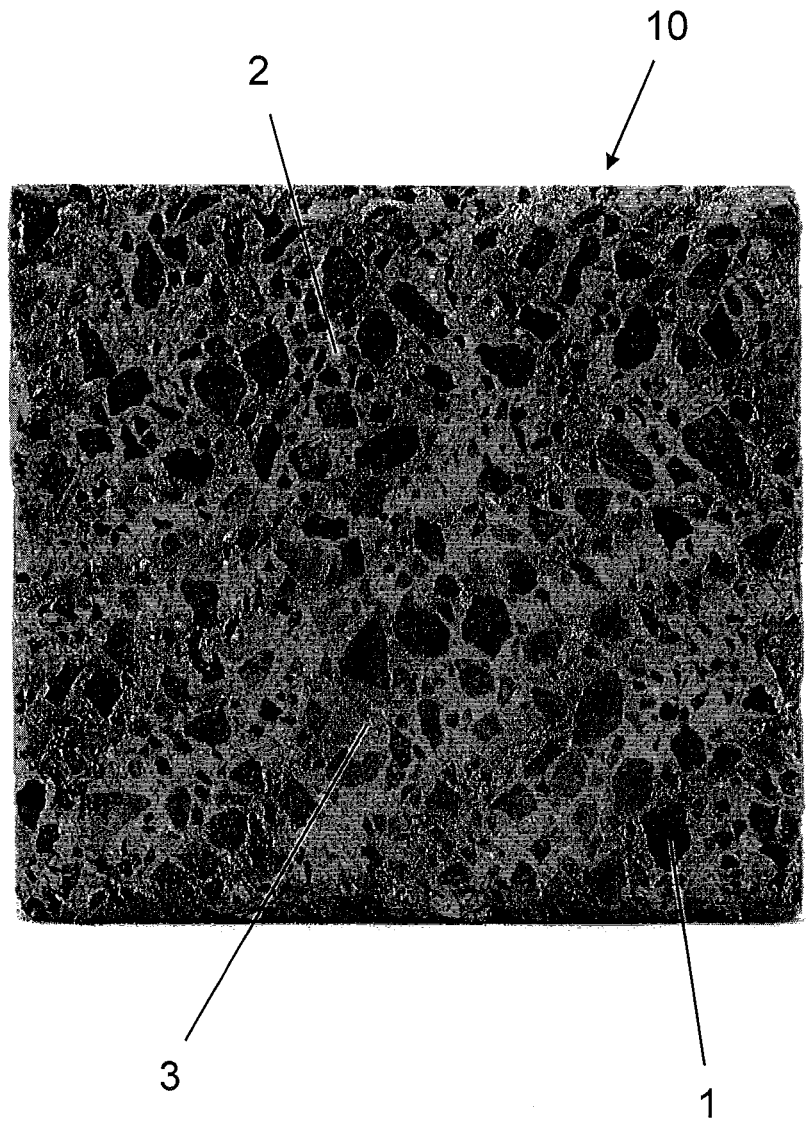
FIG. 1 shows a front view of a diagonally sawed, pressed, unfired refractory brick (FSM) according to the invention.

FIG. 1 shows the front view of a diagonally sawed, pressed, unfired refractory brick (FSM brick) according to the invention, manufactured from the following recipe:

| Raw material | Grain-size fraction mm | FSM brick Proportion % | Quantity kg |
|---|---|---|---|
| Olivine | 2-4 | 30 | 0.930 |
| Olivine | 1-2 | 15 | 0.465 |
| Nedmag 99 HD (MgO) | 0-1 | 20 | 0.620 |
| Nedmag 99 HD (MgO) | Flour | 20 | 0.775 |
| Microsilica | Flour | 5 | |
| Ref-SiC 90/94 (SiC) | Flour | 10 | 0.310 |
| | | 100 | 100.00 |
| Binder | Proportion % | | Binder in g |
| Sol-Gel-Bond | 4 | | 124 |

-continued

| Raw material | Grain-size fraction mm | FSM brick Proportion % | Quantity kg |
|---|---|---|---|
| Levasil (silica sol) | | | |

The FSM brick was dried at 150° C. to a residual moisture content of 1% by wt.

The matrix of the FSM brick exhibits a support framework of relatively coarse olivine grains 1 (dark grains) and smaller MgO grains 2 (white). The fine and finest grains of MgO are not visible. The grayish matrix material 3 exhibits substantially the fine grains of SiC and the silica particles of the silica sol.

Figure 2:
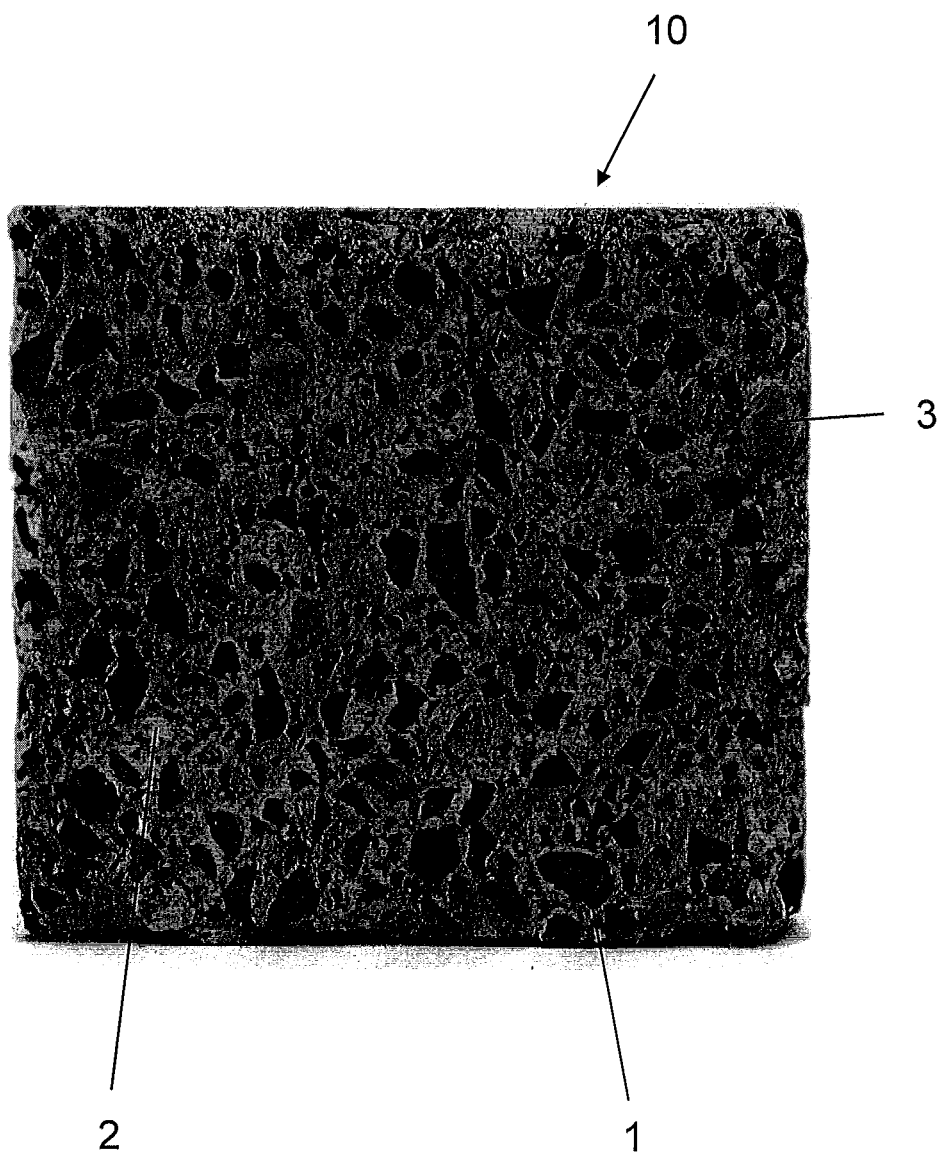
FIG. 2 shows a fired, diagonally sawed FSM brick manufactured from the same batch as the brick shown in FIG. 1.

FIG. 2 shows a fired, diagonally sawed FSM brick manufactured from the same batch. Compared with the matrix according to FIG. 1, the matrix has not changed substantially, and so like reference numerals are used to indicate like components. As already indicated hereinabove, the firing conditions were chosen according to the invention in such a way that the mixture components of the batch reacted only imperceptibly with one another during firing.

The superiority of the refractory product according to the invention compared with a magnesia-chromite brick used heretofore for the same purpose is evident from the following crucible tests according to DIN 51069.

A fayalitic slag from a copper-smelting PS converter and having the following composition of mineral phases was used:

Fayalite $Fe_2SiO_4$
Hedenbergite $CaFe(Si_2O_6)$
Magnetite $Fe_3O_4$
Mixed spinel The chemical composition of the slag was the following:

| | |
|---|---|
| $SiO_2$: | 23.58 |
| $Al_2O_3$: | 3.63 |
| $Fe_2O_3$: | 60.76 |
| $Cr_2O_3$: | 0.26 |
| $TiO_2$: | 0.22 |
| CaO: | 1.58 |
| MgO: | 1.06 |
| $SO_3$: | 0.21 |
| NiO: | 0.22 |
| CuO: | 3.28 |
| ZnO: | 4.38 |
| PbO: | 0.47 |

Figure 3:
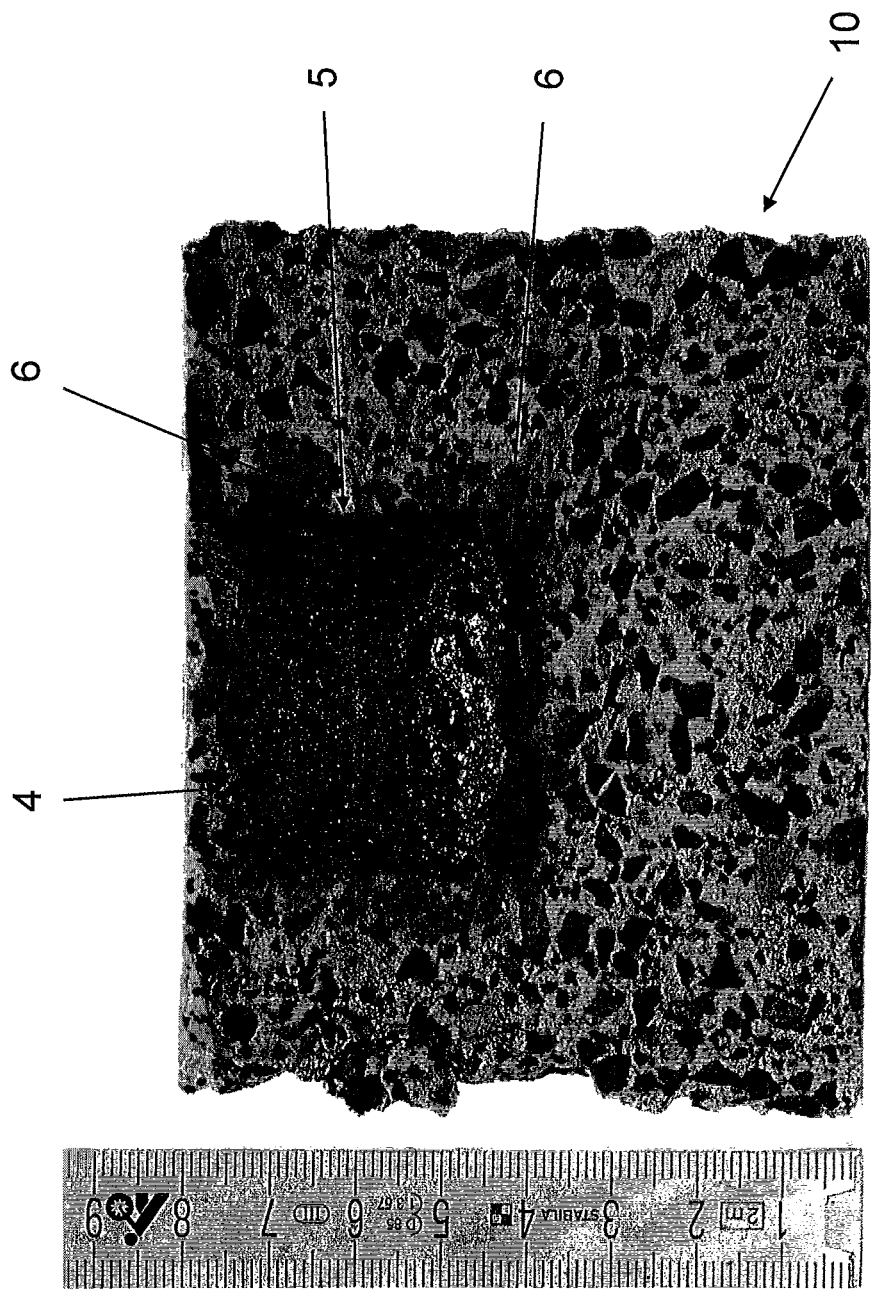
FIG. 3 shows a fired, diagonally sawed FSM brick with a molten slag in a recess.

The slag was introduced as powder into a recess or a crucible 4 of an unfired FSM brick 10 prepared for a crucible test, heated to 1350° C. and maintained at this temperature for 6 hours. After cooling, the crucible was sawed diagonally. FIG. 3 shows the result of the diagonally sawed brick. The molten slag 6 has hardly penetrated into the brick. Even the corrosion of the FSM brick is slight, as is evident from the still-sharp contours 5 of crucible 4.

Figure 4:
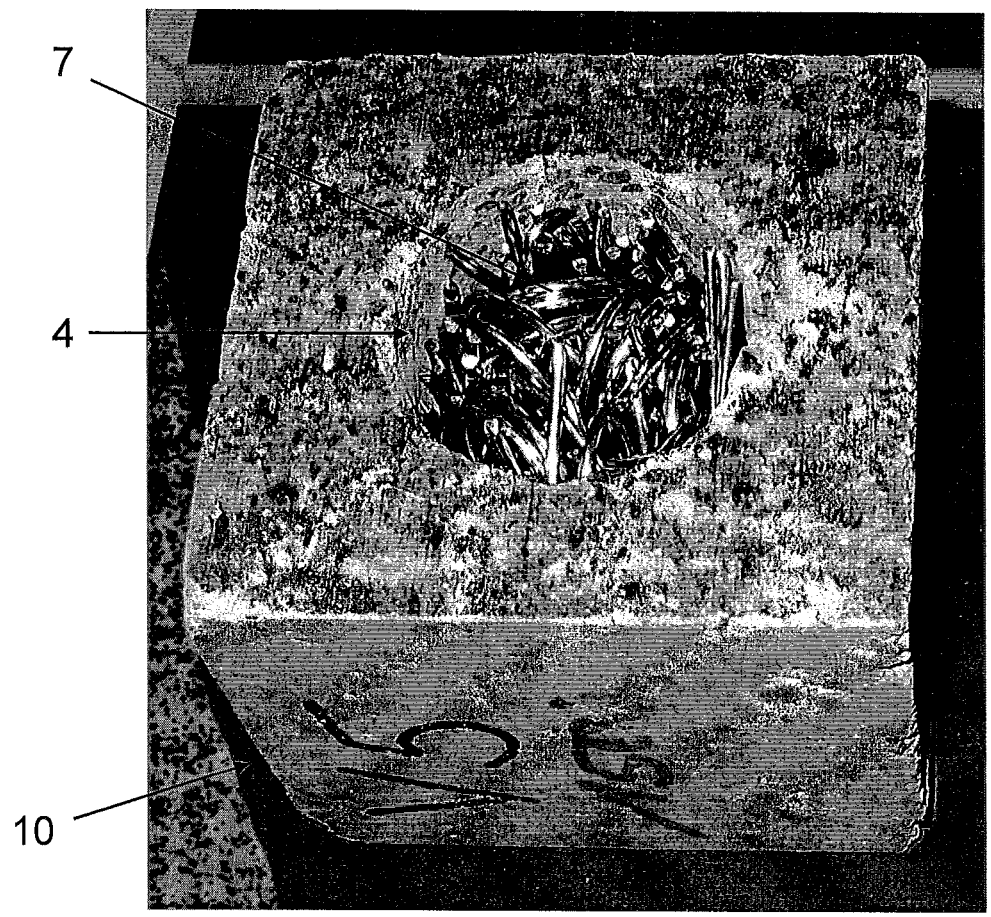
FIG. 4 shows an unfired FSM brick with copper wire in a recess.
Figure 6:
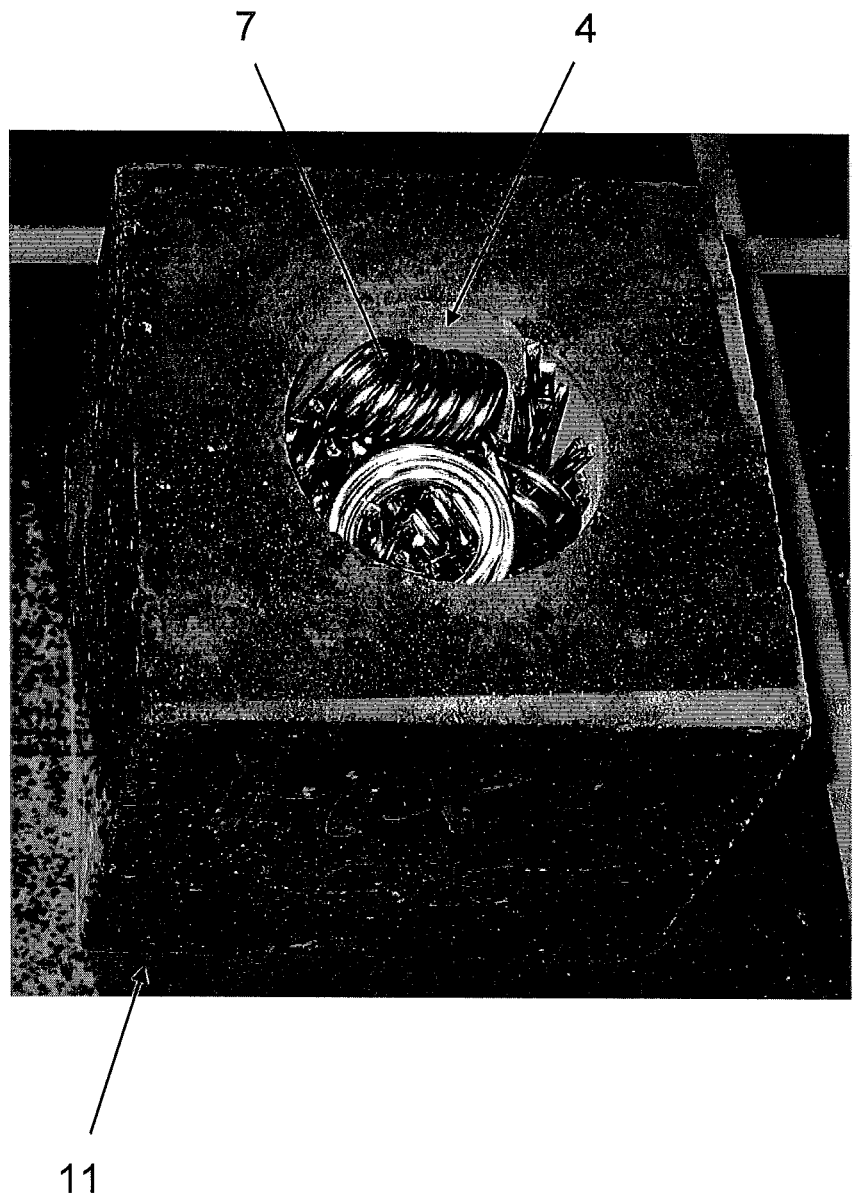
FIG. 6 shows an unfired $Cr_2O_3$ brick with copper wire in a recess.

In a further test, the behavior relative to copper melts was investigated. For this purpose, 75 g copper wire 7 was filled into a crucible 4 made from an unfired FSM brick 10 (FIG. 4) and heated for 6 hours to 1350° C. As a comparison (FIG. 6), a directly bonded Mg—Cr brick 11 (28% $Cr_2O_3$, basis fused magnesia) was treated in exactly the same way.

Figure 5:
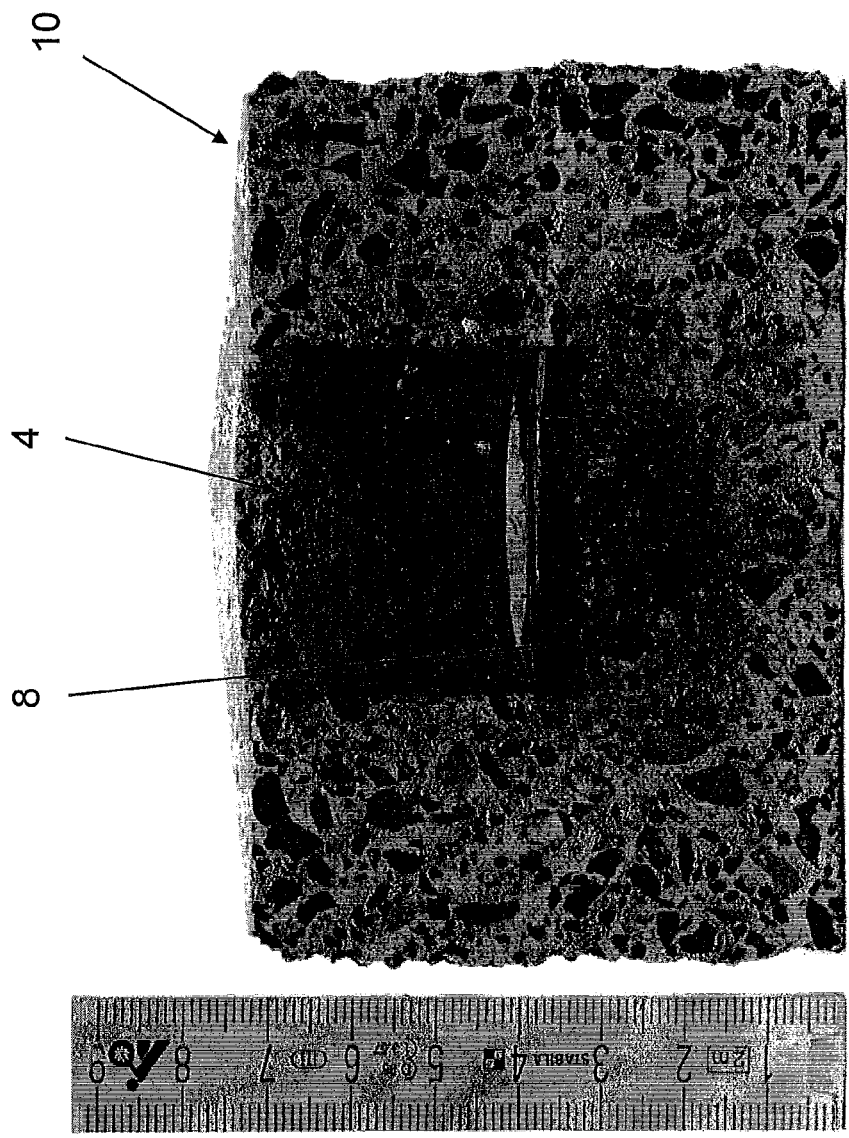
FIG. 5 shows the FSM brick of FIG. 4 after firing.
Figure 7:
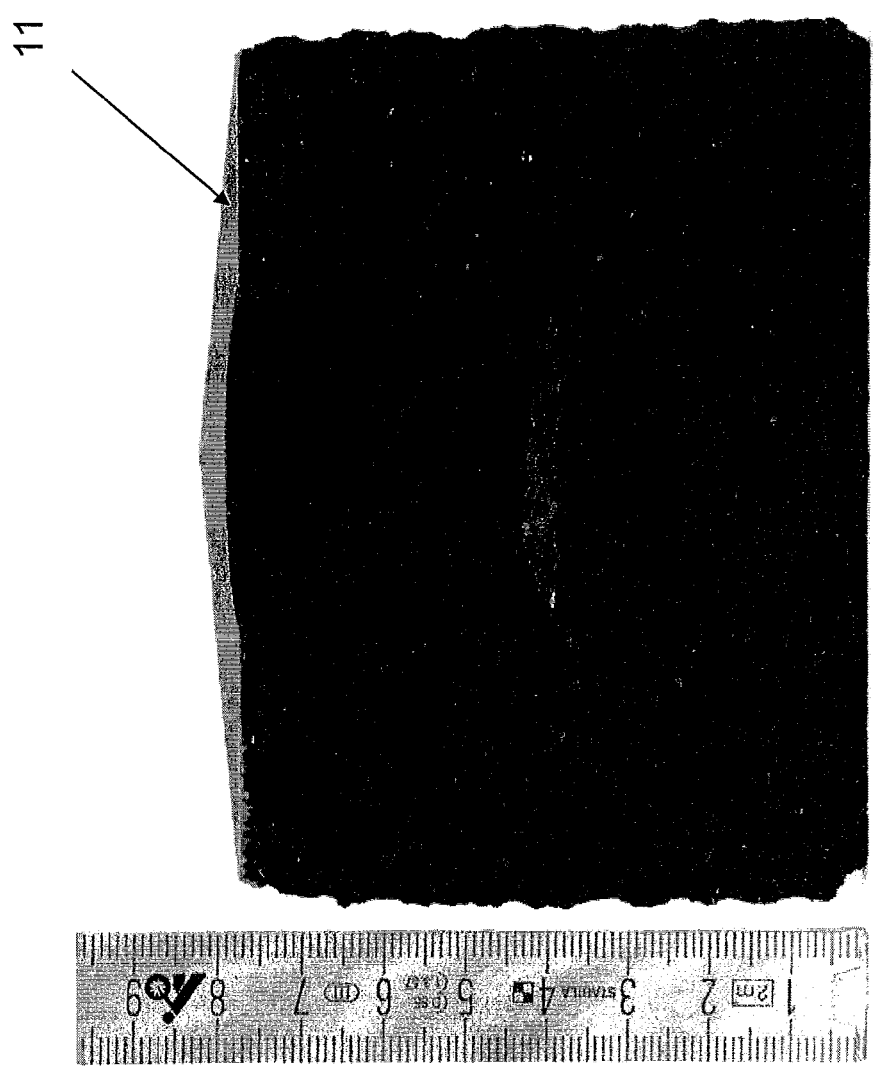
FIG. 7 shows the brick of FIG. 6 after firing.

After cooling and diagonal sawing of crucible 4, it was found that copper melt was no longer present in crucible 4 of the Mg—Cr brick (FIG. 7). This behavior is known and means in practice that the Mg—Cr bricks spall and thus wear away relatively rapidly due to the altered thermomechanical characteristics of the infiltrated part. In contrast, the completely solidified copper melt 8 can still be found in crucible 4 of the FSM brick 10. Almost nothing has penetrated into the brick (FIG. 5). Compared with the Mg—Cr brick, therefore, the FSM brick exhibits the following advantages in particular in a PS converter:

manufacturing-related: the brick does not have to be fired but instead merely dried, in order that it can be manipulated and built in. Thereby the brick can be produced more cheaply and in less environmentally polluting manner.

application-related: the FSM brick is not penetrated by copper melts and is penetrated to only slight extent by fayalitic slag, and thus, because of its greater thermomechanical resistance, wears away more slowly than an Mg—Cr brick.

The products according to the invention are suitable in particular for use in PS converters for copper production, but are also usable with advantages compared with the usual refractory products in other applications, in which fayalitic slags and highly mobile heavy nonferrous metal melts are present, as is practically the case in the entire heavy nonferrous metals industry.

The concept according to the invention is derived from the fact that, by virtue of the coarse-grained olivine as well as fine-grained SiC and MgO, the equilibrium in the brick between the reactive substances from the brick and the slag is established only at process temperatures between, for example, 1200 and 1350° C. At these temperatures, SiC is still fully active in terms of anti-wetting effect, despite oxidizing process conditions. MgO reacts with the binding component to Si gel (gelled binder component of the silica sol) (nanobond) as well as with the oxidation product of SiC that may be formed to forsterite. According to the invention, MgO is chosen in stoichiometric excess relative to $SiO_2$ available for a reaction, in order to prevent the formation of enstatite, which is not refractory. These reactions in situ seal the brick directly on the firing side and prevent the penetration by the very mobile metal melt, e.g. copper melt. The SiC additionally acts as a slag brake. In contact with the generally present fayalite slags, the excess MgO together with the forsterite also reacts to olivine solid solutions. The liquidus temperature rises as a result, i.e. the reaction product between slag and brick freezes or leads to stiffening of the slag, and the corrosion reaction is stopped or else at least greatly reduced.

Accordingly, a batch according to the invention exhibits at least the following compositions:

at least 30% by wt, especially at least 40% by wt of a coarse-grained raw olivine substance, containing forsterite contents of, for example, at least 70% by wt, especially of at least 90% by wt, preferably at least 100% by wt, and having grain sizes corresponding, for example, to 100% by wt, especially 80% by wt, preferably 50% by wt larger than 0.1 mm, at least 35% by wt, especially at least 40% by wt magnesia (MgO) in flour form with grain sizes corresponding, for example, to 100% by wt, especially 80% by wt, preferably 50% by wt≤1 mm, at least 5% by wt, especially at least 10% by wt silicon carbide (SiC) in flour form with grain sizes corresponding, for example, to 100% by wt, especially 80% by wt, preferably 50% by wt≤1 mm, optionally at most 10% by wt, especially at most 5% by wt of a dry finely divided silica ($SiO_2$), preferably in the form of microsilica and/or of a pyrogenic and/or precipitated silica, optionally at most 10% by wt, especially at most 5% by wt of at least one further additive for refractory products, such as antioxidants, rest up to 100% by wt of respectively at least one of the other solids plus at least 2% by wt of a liquid binder in the form of an alkali-low, preferably alkali-free silica sol, calculated relative to the dry solids.

The invention claimed is:

1. Dry substance mixture for a refractory batch containing at least 30% by wt of a coarse-grained raw olivine substance, containing forsterite contents of at least 70% by wt and having grain sizes larger than 0.1 mm, at least 35% by wt magnesia (MgO) in flour form with at least 50% by wt of the magnesia having grain sizes ≤1 mm, at least 5% by wt silicon carbide (SiC) in flour form with grain sizes ≤1 mm, 0-10% by wt of a dry finely divided $SiO_2$ 0-10% by wt of at least one further additive for refractory products, —rest up to 100% by wt of respectively at least one of the other solids.

2. Dry substance mixture according to claim 1, containing the following solids in the mixing ratio:

Raw olivine substance: 30 to 60% by wt

MgO: 35 to 50% by wt

SiC: 5 to 20% by wt $SiO_2$: 0 to 10% by wt

Refractory additives: 0 to 10% by wt.

3. Dry substance mixture according to claim 1, wherein the raw olivine substance is a natural raw olivine substance and/or a synthetically manufactured forsterite material and the grain size of the raw olivine substance lies in the medium and coarse size range.

4. Dry substance mixture according to claim 1, wherein the MgO content of the magnesia is greater than 90% by wt and the grain-size distribution of the magnesia flour corresponds to a Gaussian grain-size distribution.

5. Dry substance mixture according to claim 1, wherein the silicon carbide flour has a purity of greater than 90% by wt of SiC.

6. Refractory batch containing a dry substance mixture according to claim 1, wherein the batch contains, in addition to the dry mixture, at least 2% by wt of a liquid binder in the form of an alkali-free silica sol having a total content of alkalies of zero calculated relative to the dry solids.

7. Refractory batch according to claim 1, wherein the batch contains, in addition to the dry mixture, at least 2% by wt of a liquid binder in the form of a silica sol, calculated relative to the dry solids, and wherein the silica sol has a total content of alkalies of less than 1% by wt.

8. Batch according to claim 6, wherein the silica sol is a colloidal dispersion of amorphous silicon dioxide particles in water and has $SiO_2$ concentrations of between 15 and 50% by wt.

9. Batch according to claim 6, wherein silica sol is present in proportions between 2 and 10% by wt, calculated relative to the dry solids.

10. Batch according to claim 1, wherein the batch is provided subdivided in a package of at least two containers, wherein the dry solids are packed in one container and the silica sol is packed in the other container.

11. A method of manufacturing molded bricks comprising:

providing a batch according to claim 6, mixing batch components of the batch to an aqueous compound and then pressing the compound to molded bricks in a molding press and then drying the molded bricks.

12. The method according to claim 11, wherein the dried molded bricks are fired ceramically in a ceramic furnace.

13. The method according to claim 12, wherein the firing conditions are chosen such that the dry and dried components of the batch react with one another not at all or to only a small extent during firing.

14. Molded brick manufactured according to the method of claim 11, wherein the brick exhibits an apparent density between 2.6 and 2.7 kg/m³ and a compressive strength of 25 to 50 MPa.

15. Molded brick manufactured according to the method of claim 12, exhibiting an apparent density of 2.55 to 2.65 kg/m³ and a compressive strength of 30 to 55 MPa.

16. A method of manufacturing a refractory casting compound or a refractory vibratory compound comprising:

providing a batch according to claim 6, and adjusting ductility of the compound with additional water.

17. Dry substance mixture according to claim 1, wherein the forsterite contents of the coarse-grained raw olivine substance constitutes at least 90% by weight of the coarse-grained raw olivine substance.

18. Dry substance mixture according to claim 1, wherein the forsterite contents of the coarse-grained raw olivine substance constitute 100% by weight of the coarse-grained raw olivine substance.

19. Dry substance mixture according to claim 1, wherein 100% by weight of the coarse-grained raw olivine substance has the grain sizes larger than 0.1 mm.

20. Dry substance mixture according to claim 1, wherein 80% by weight of the coarse-grained raw olivine substance has the grain sizes larger than 0.1 mm.

21. Dry substance mixture according to claim 1, wherein 50% by weight of the coarse-grained raw olivine substance has the grain sizes larger than 0.1 mm.

22. Dry substance mixture according to claim 1, wherein the dry substance mixture contains at least 40% by wt of the magnesia (MgO) in flour form.

23. Dry substance mixture according to claim 1, wherein at least 80% by wt of the magnesia has grain sizes ≤1 mm.

24. Dry substance mixture according to claim 1, wherein 100% by wt of the magnesia has grain sizes ≤1 mm.

25. Dry substance mixture according to claim 1, wherein the dry substance mixture contains at least 10% by wt of the silicon carbide (SiC) in flour form.

26. Dry substance mixture according to claim 1, wherein 100% by wt of the silicon carbide (SiC) in flour form has the grain sizes ≤1 mm.

27. Dry substance mixture according to claim 1, wherein 80% by wt of the silicon carbide (SiC) in flour form has the grain sizes ≤1 mm.

28. Dry substance mixture according to claim 1, wherein 50% by wt of the silicon carbide (SiC) in flour form has the grain sizes ≤1 mm.

29. Dry substance mixture according to claim 1, wherein the dry substance mixture contains 0-5% by wt of a dry finely divided $SiO_2$.

30. Dry substance mixture according to claim 1, wherein the dry finely divided $SiO_2$ is in the form of microsilica and/or pyrogenic and/or precipitated silica.

31. Dry substance mixture according to claim 1, wherein the at least one further additive for refractory products comprises antioxidants.

32. Dry substance mixture according to claim 2, containing the following solids in the mixing ratio:
Raw olivine substance: 40 to 50% by wt
MgO: 40 to 45% by wt
SiC: 10 to 15% by wt
$SiO_2$: 0 to 5% by wt
refractory additives 0 to 5% by wt.

33. Dry substance mixture according to claim 3, wherein the grain size of the raw olivine substance lies between 0.1 mm and 6 mm.

34. Dry substance mixture according to claim 3, wherein the grain size of the raw olivine substance lies between 1 mm and 6 mm.

35. Dry substance mixture according to claim 3, wherein the grain size of the raw olivine substance has a Gaussian distribution.

36. Dry substance mixture according to claim 4, wherein the MgO content of the magnesia is greater than 95% by wt.

37. Dry substance mixture according to claim 5, wherein the silicon carbide flour has a purity of greater than 90% by wt of SiC.

38. Batch according to claim 7, wherein the silica sol has a total content of alkalies of less than 0.5% by wt.

39. Batch according to claim 8, wherein the silica sol has $SiO_2$ concentrations of between 20 and 40% by wt.

40. Batch according to claim 8, wherein the specific surface of the silicon dioxide particles lies between 100 and 400 $m^2/g$.

41. Batch according to claim 8, wherein the specific surface of the silicon dioxide particles lies between 200 and 300 $m^2/g$.

42. Batch according to claim 6, wherein the silica sol is present in proportions between 3 and 6% by wt, calculated relative to the dry solids.

43. The method according to claim 11, wherein the molded bricks are dried to a maximum residual moisture content of 2% by wt.

44. The method according to claim 12, wherein the dried molded bricks are fired ceramically in a ceramic furnace at temperatures between 1000° C. and 1300° C. in oxidizing atmosphere.

45. The method according to claim 12, wherein the dried molded bricks are fired ceramically in a ceramic furnace at temperatures between 1150° C. and 1250° C. in oxidizing atmosphere.

46. The method according to claim 12, wherein the dried molded bricks are fired ceramically in the ceramic furnace with a firing duration between 4 and 8 hours.

47. The method according to claim 12, wherein the dried molded bricks are fired ceramically in the ceramic furnace with a firing duration between 5 and 6 hours.

48. Molded brick manufactured according to the method of claim 11, wherein the brick exhibits a compressive strength of 35 to 45 Mpa.

49. Molded brick manufactured according to the method of claim 12, wherein the brick exhibits a compressive strength of 40 to 50 Mpa.

* * * * *